July 22, 1930.　　　J. R. HACKETT　　　1,771,294
BREAD BOARD AND KNIFE HOLDER
Filed April 3, 1929
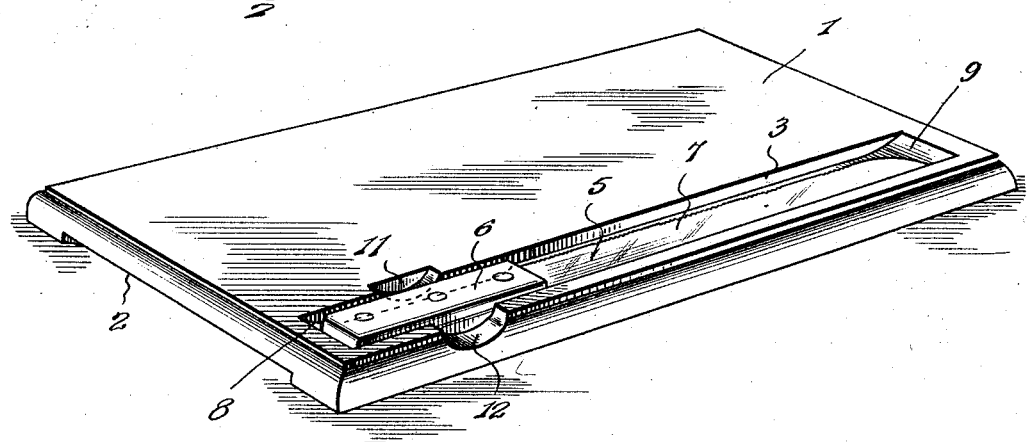
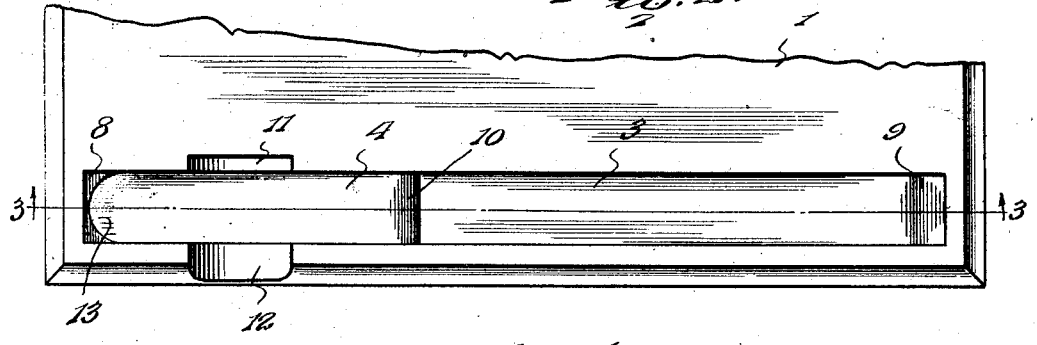
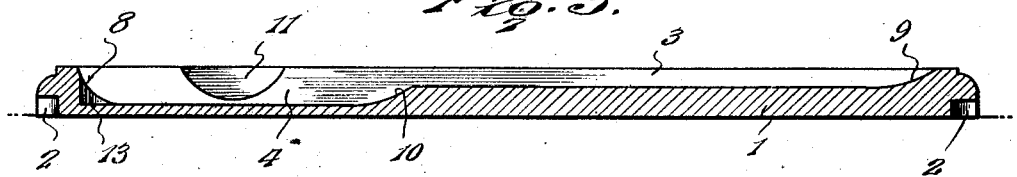
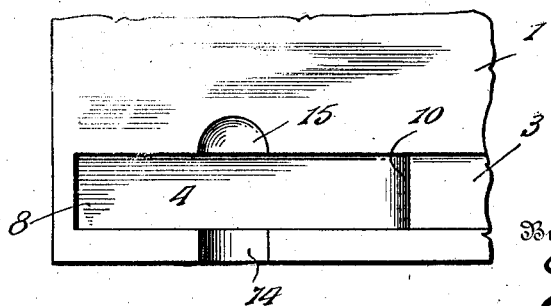
Inventor
J. R. Hackett.
By Lacey & Lacey, Attorneys Patented July 22, 1930

1,771,294

UNITED STATES PATENT OFFICE

JAMES R. HACKETT, OF PHILADELPHIA, PENNSYLVANIA

BREAD BOARD AND KNIFE HOLDER

Application filed April 3, 1929. Serial No. 352,276.

This invention relates to kitchen articles and more particularly to a combination bread board and knife holder.

One object of the invention is to provide a bread board formed with a pocket in which a bread knife may be conveniently placed so that the knife will always be accessible for immediate use when it is desired to slice bread.

Another object of the invention is to so form the knife-receiving pocket that, when a knife is placed therein, the handle portion thereof will be disposed in a plane below the upper surface of the board and not offer any surface obstruction to the cutting face of the board.

Another object of the invention is to provide a bread board, the knife-receiving pocket of which will accommodate a knife formed with either a square or round rear end and further to provide the walls of the pocket with finger notches whereby the handle of the knife may be conveniently grasped when it is desired to remove the knife for use.

Another object of the invention is to so form the bottom of the pocket that a knife will be guided out of the pocket when grasped by its handle and slid longitudinally in the pocket.

The invention is illustrated in the accompanying drawing, wherein

Figure 1 is a perspective view of the improved combination bread board and knife holder with a knife resting in the knife-receiving recess in the board, Fig. 2 is a fragmentary top plan view of the bread board showing the recess with the knife removed therefrom, Fig. 3 is a longitudinal sectional view through the bread board taken on the line 3—3 of Fig. 2, and Fig. 4 is a fragmentary top plan view of a modified form of the invention.

The bread board, which is indicated in general by the numeral 1, is formed of wood and is provided with a flat upper surface upon which a loaf of bread rests while slices are cut from the loaf. Notches 2 are preferably formed at the ends of the board and provide finger holds so that the bread board may be easily lifted from a table or other support upon which it is placed. The edges of the board may be cut at right angles to the upper and lower faces thereof or they may be formed, as shown in Fig. 1, with an ornamental border in order to improve the appearance of the board.

In order to receive a bread knife, there has been provided a pocket or recess 3 which extends longitudinally of the board in close proximity to a side edge thereof so that the upper face of the board will be flat and uninterrupted for the major portion of its width, thereby providing a wide surface upon which a loaf of bread may be placed and slices cut from the loaf without interference by the recess. One end portion of the recess is deepened, as shown at 4, so that when the knife, which is indicated in general by the numeral 5, is placed in the recess its handle 6 will be received in the deepened end portion or pocket 4 without projecting upwardly above the upper face of the board and its blade 7 will rest flat upon the bottom of the recess, as shown in Fig. 1. The end portions 8 and 9 of the recess and the inner end portion 10 of the pocket 4 are curved longitudinally of the recess, as shown clearly in Fig. 3. By this arrangement a knife may be very easily fitted into the recess and if it is not accurately placed therein the curved surface 8 at the outer end of the pocket will cause the knife to slide easily into the recess constituting cam surfaces. When it is desired to remove the knife from the recess, it is merely necessary to grasp the handle from opposite sides and by sliding it longitudinally towards the inner end of the pocket the curved surfaces 9 and 10 will act upon the free end of the blade and forward end of the handle and guide the knife upwardly out of the recess. Therefore, the knife can be very easily set in place or removed from the recess. Notches 11 and 12 are formed intermediate the length of the pocket 4 at opposite sides thereof to receive a person's fingers and allow the handle of the knife to be easily grasped when the knife is to be removed. It should be noted that the notch 12 opens through a side edge face of the board, thereby allowing a person's thumb to be easily engaged in this notch and the knife handle grasped between the thumb and a finger engaged in the notch 11. The outer end of the pocket 4 is deepened, as shown at 13, so that if a knife having its handle formed with a rounded rear end is placed in the recess, the rounded rear end of the handle may be received in the end portion 13 of the pocket and the handle allowed to fit snugly into the pocket.

In Fig. 4, there has been shown a slightly modified form of the invention. Referring to this figure, it will be seen that the notch 14 corresponds to the notch 12, whereas the notch 15 is somewhat wider than the notch 11 and of a cup-shaped formation so that a finger may be easily fitted into this notch when the handle of a knife is to be grasped and the knife lifted from the recess. While the pocket shown in Fig. 4 is not provided with a rounded end portion corresponding to the portion 13 of the pocket shown in Figs. 2 and 3, it will be understood that it may be provided with this formation if so desired.

When the bread board is in use, a bread knife of a conventional construction is placed in the pocket with its handle fitting into the deepened end portion or pocket 4 and its blade extending along the bottom of the recess between the deepened pocket and the sloping surface 9 at the forward end of the recess. When the knife is to be used, a thumb and finger are engaged in the notches at opposite sides of the pocket and after grasping the handle between a thumb and finger the knife is slid forwardly. This causes the forward end of the handle and the free end of the blade to move forwardly over the sloping surfaces 10 and 9 and a cam action will take place which will cause the knife to move upwardly out of the pocket. A loaf of bread is placed upon the bread board and slices cut from the loaf in the usual manner and since the recess is formed close to one side edge of the board the upper face of the board will be unobstructed throughout the major portion of its width and thereby provide ample surface for the loaf of bread to rest upon while being sliced. After a sufficient number of slices have been cut from a loaf of bread, the knife is returned to the recess and if it is not accurately placed it will be guided into the recess by the sloping surface 8 at the outer end of the pocket 4.

It will thus be seen that there has been provided a bread board having associated therewith a knife which will always be readily accessible when it is to be used.

Having thus described the invention, I claim:

1. A bread board having its upper face formed with a recess extending along the board and constituting a seat for a bread knife, the said recess having one end portion deepened whereby a knife placed in the recess may have its blade received in the shallow portion of the recess, and its handle in the deepened portion of the recess, the inner end of the deepened portion and the ends of the recess having faces curved longitudinally of the recess constituting cam surfaces whereby a knife may be slid longitudinally into and out of the recess.

2. A bread board having its upper face formed with a recess extending along the board and constituting a seat for a bread knife, the said recess having one end portion deepened whereby a knife placed in the recess may have its blade received in the shallow portion of the recess and its handle in the deepened portion of the recess, notches being formed at opposite sides of the deepened portion of the recess whereby the handle of the knife in the recess may be easily grasped, the said recess extending longitudinally of the board adjacent a side edge thereof and one of the said side notches opening through the said side edge face of the board.

3. A bread board having a flat upper face formed with a recess extending along the board adjacent an edge thereof and constituting a seat for a knife, one end portion of the recess being deepened to receive the handle of a knife, notches being formed at opposite sides of the deepened portion of the recess and one notch opening through the adjacent edge face of the board, the ends of the recess and the inner end of its deepened portion having longitudinally curved surfaces constituting cam surfaces and the notches having their walls formed arcuate longitudinally of the recess whereby fingers disposed in the notches and gripping a knife handle from opposite sides will be guided upwardly out of the notches as the knife is moved longitudinally of the recess and guided upwardly out of the recess by the cam surfaces thereof.

In testimony whereof I affix my signature.

JAMES R. HACKETT. [L. S.]